UNITED STATES PATENT OFFICE.

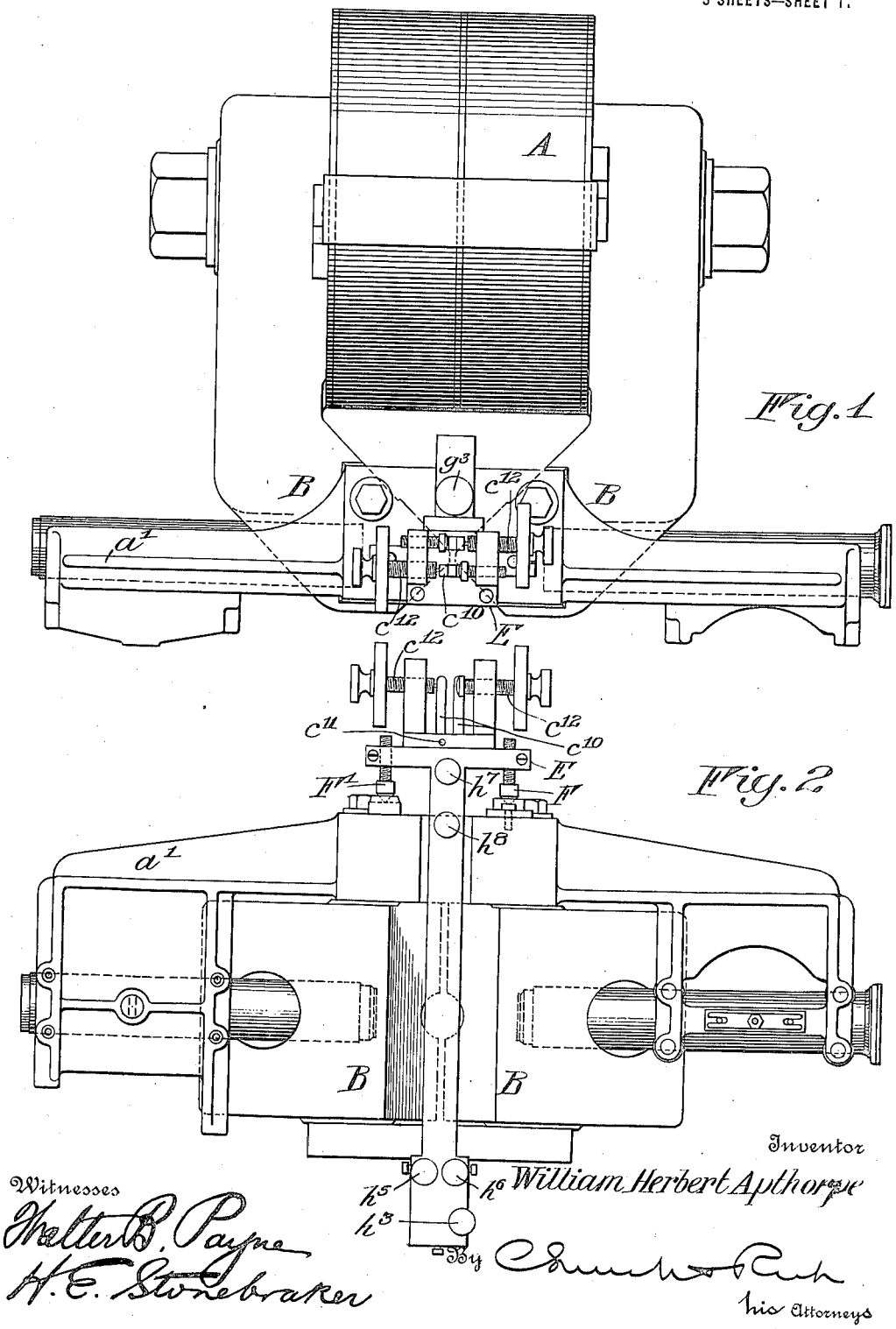

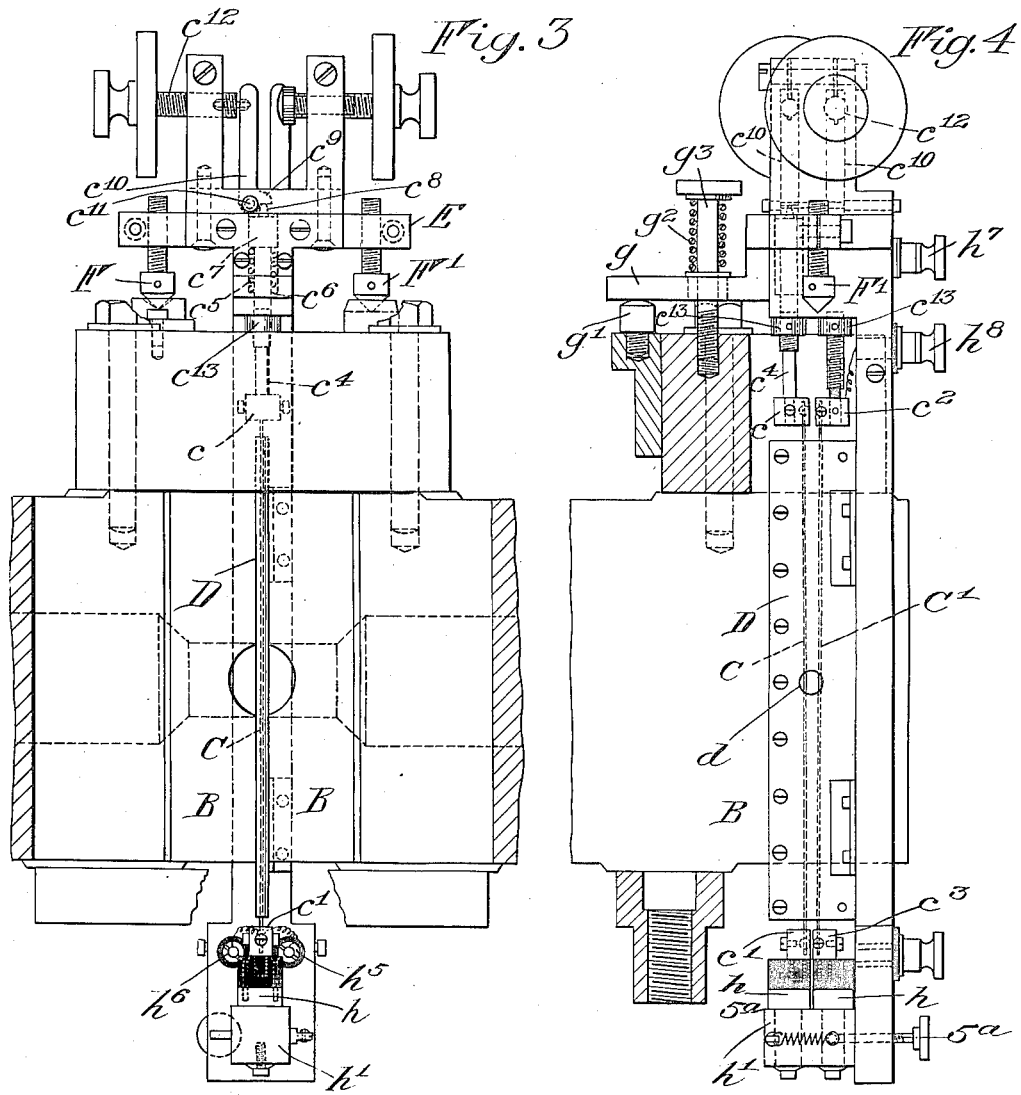

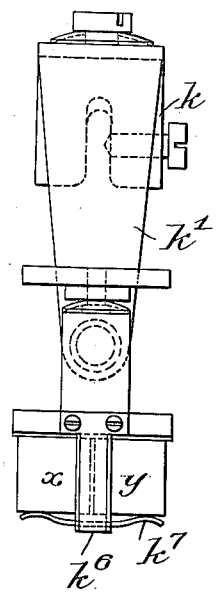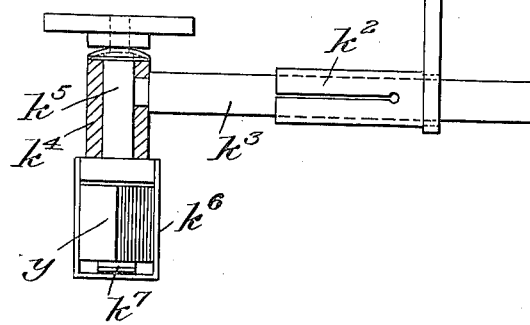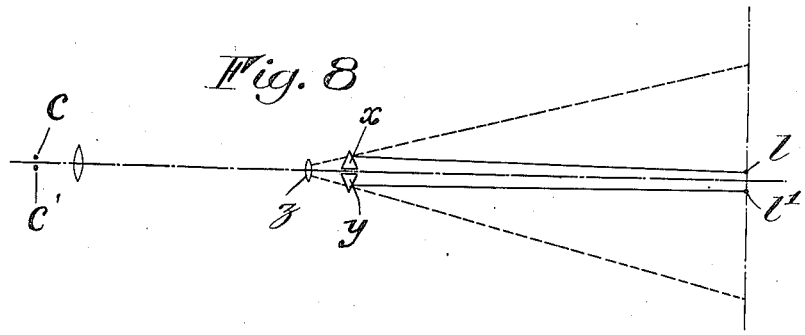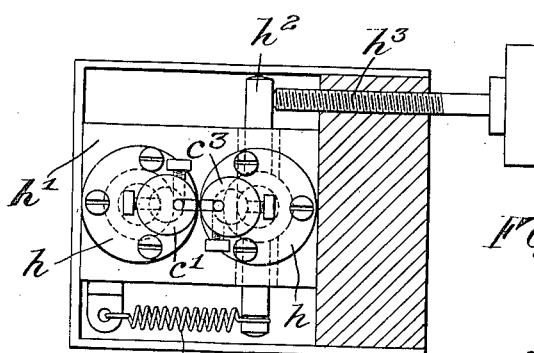

WILLIAM HERBERT APTHORPE, OF CAMBRIDGE, ENGLAND, ASSIGNOR TO TAYLOR INSTRUMENT COMPANIES, OF ROCHESTER, NEW YORK, A CORPORATION OF NEW YORK.

GALVANOMETER.

1,219,617.        Specification of Letters Patent.        Patented Mar. 20, 1917.

Application filed August 14, 1914. Serial No. 856,710.

*To all whom it may concern:*

Be it known that I, WILLIAM HERBERT APTHORPE, a subject of the King of Great Britain, residing at Cambridge, England, have invented certain new and useful Improvements in Galvanometers; and I do hereby declare the following to be a full, clear, and exact description of the same, reference being had to the accompanying drawings, forming a part of this specification, and to the reference-numerals marked thereon.

My invention relates to galvanometers and similar instruments of the type in which a conducting fiber is maintained in a magnetic or electrostatic field and its movements observed or recorded when a current passes therethrough. Such instruments are employed for measuring small currents, as for instance those generated by muscular movements, or for receiving wireless messages, and the present invention has for its object to afford a construction whereby two or more fibers may be arranged in the magnetic field in the same or independent electric circuits, in such a manner that they may be adjusted relatively to each other to bring them both to a position within the field of vision of the optical system by which they are observed. A further purpose of the invention is to provide the optical system referred to with means for bringing the images of the fibers sufficiently close for photographic impression or observation. To these and other ends the invention consists in certain improvements and combinations of parts, all as will be hereinafter more fully described, the novel features being pointed out in the claim at the end of the specification.

In the drawings:

Figure 1 is a plan view of a galvanometer equipped with a preferred embodiment of my invention;

Fig. 2 is a side elevation;

Fig. 3 is an enlarged view of the fiber supporting devices;

Fig. 4 is a side view of the same;

Fig. 5 is a sectional view on the line $5^a$—$5^a$ of Fig. 4;

Fig. 6 is an end elevation of the attachment for the optical system to effect adjustment of the images of the fibers;

Fig. 7 is a side elevation of the same, and

Fig. 8 is a diagrammatic view showing the position of the fibers with relation to the optical system.

Similar reference characters in the several figures indicate the same parts.

In the embodiment shown A designates an electro-magnet of which B are the poles, the fibers being suspended between the latter, as will be described presently. The fibers are designated at C and C', being arranged in the casing D, which is provided with an opening $d$ through which the fibers are visible. The fibers are mounted so that the tension of each can be adjusted independently of the other, and to this end the fiber C is supported between clamps $c$ and $c'$ while the fiber C' is supported between the clamps $c^2$ and $c^3$. The clamps $c$ and $c^2$ are each mounted on a pin $c^4$, which is slidably mounted in the holder and actuated upwardly by means of a spring $c^5$ arranged between a shoulder $c^6$ and the enlarged head $c^7$. The pin $c^4$ carries at its upper end a projection $c^8$ which engages the short arm $c^9$ of a lever $c^{10}$. The latter is pivoted at $c^{11}$ and is adjustable to change the tension of the fiber by means of a set-screw $c^{12}$ which is operated to change the position of the lever $c^{10}$ by engagement with the long arm of the latter. When the set-screw is operated to depress the short arm $c^9$, the tension on the fiber is decreased, while adjustment in the opposite direction releases the spring $c^5$ correspondingly, and permits it to lift the pin $c^4$, and thus increase the tension of the fiber. $c^{13}$ designates a nut which limits the degree of tension to which the fiber can be subjected.

The holder which supports the fiber retaining clamps is designated generally at E, being suspended on the poles of the magnet from three points and adjustable with relation thereto. To this end, the holder carries a pair of adjustable legs F, F', which engage coöperating sockets on the magnet poles. The holder also carries an arm or bracket $g$ engaging a stop $g'$ and held thereagainst by the spring $g^2$, which is arranged between the arm or bracket and the head of an adjustable screw $g^3$. By adjusting the legs F and F' just described, the holder can be moved until one of the fibers is brought properly into the field of vision of the optical system, whereupon the remaining fiber is adjusted in the manner that will now be explained until it also is within the field of vision.

Each of the clamps $c'$, $c^3$ is mounted eccentrically on a post $h$, which is mounted to turn in a bracket $h'$. The post carries a transversely arranged pin $h^2$ which extends beyond the opposite sides thereof through an enlarged opening in the bracket $h'$. One end of the pin $h^2$ engages an adjustable set-screw $h^3$ while the opposite end is connected to a spring $h^4$ which in turn is secured to the bracket. It will be seen that by turning the set-screw $h^3$ the clamp will be turned correspondingly through a slight angle causing the fiber to be adjusted in a lateral direction. The clamps $c'$ and $c^3$ are mounted on insulating blocks and connected with the terminals $h^5$ and $h^6$. The clamp $c$ forms a circuit with the holder, which carries the terminal $h^7$, while $h^8$ designates the terminal to which the clamp $c^2$ is connected, the latter being insulated from the holder.

In order to bring the images of the fibers into closer relation for observing or photographing them, I may provide a pair of prisms, which are suitably arranged with relation to the optical axis so as to divert the rays. To this end I employ a clamp $k$ which is conveniently attached to the web $a'$ of the frame of the instrument and carries a holder $k'$ to which is secured a split tube $k^2$. Slidably arranged within the tube is a rod $k^3$ which carries at its outer end a sleeve $k^4$ in which turns a pin $k^5$. The pin $k^5$ carries a frame $k^6$ within which the prisms $x$ and $y$ are mounted, they being held in proper relation by the spring $k^7$. Fig. 8 shows diagrammatically the position of the prisms with relation to the microscope lens $z$, and by the construction last described, the prisms $x$, $y$ can be brought into proper position before the lens by sliding the rod $k^3$ and by turning the pin $k^5$ so that the rays shown in dotted lines will be diverted, and the images $l$, $l'$ of the fibers C C' brought close together when they are projected onto the plate.

I claim as my invention:

In a galvanometer, the combination with a plurality of fibers mounted in a magnetic field, of supporting means for the fibers including clamps that are adjustable to change the relative position of the fibers and means for adjusting the tension of the fibers independently of each other.

WILLIAM HERBERT APTHORPE.

Witnesses:
WALTER I. SKERTEN,
KENNETH L. STEWARD.